United States Patent
Wang et al.

(10) Patent No.: US 7,978,624 B2
(45) Date of Patent: Jul. 12, 2011

(54) METHOD FOR RESTRAINING CROSS-SLOT INTERFERENCE IN SLOT CDMA SYSTEM

(75) Inventors: Yingmin Wang, Beijing (CN); Shiyan Ren, Beijing (CN); Jinling Hu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 583 days.

(21) Appl. No.: 12/066,176

(22) PCT Filed: Sep. 7, 2006

(86) PCT No.: PCT/CN2006/002309
§ 371 (c)(1),
(2), (4) Date: Aug. 6, 2008

(87) PCT Pub. No.: WO2007/028335
PCT Pub. Date: Mar. 15, 2007

(65) Prior Publication Data
US 2009/0010228 A1 Jan. 8, 2009

(30) Foreign Application Priority Data
Sep. 7, 2005 (CN) .......................... 2005 1 0098767

(51) Int. Cl.
*H04W 4/00* (2009.01)
*H04W 28/00* (2009.01)
(52) U.S. Cl. .................. 370/252; 370/335; 370/342
(58) Field of Classification Search .................. None
See application file for complete search history.

(56) References Cited

U.S. PATENT DOCUMENTS

| | | | | |
|---|---|---|---|---|
| 6,334,057 | B1 * | 12/2001 | Malmgren et al. | 455/450 |
| 6,466,557 | B1 * | 10/2002 | Doi | 370/332 |
| 7,450,905 | B2 * | 11/2008 | Pan | 455/63.1 |
| 2004/0100928 | A1 | 5/2004 | David et al. | |
| 2005/0141466 | A1 * | 6/2005 | Krupka | 370/338 |
| 2005/0152279 | A1 * | 7/2005 | Robertson et al. | 370/252 |

FOREIGN PATENT DOCUMENTS

| | | |
|---|---|---|
| CN | 1445950 A | 10/2003 |
| CN | 1520077 A | 8/2004 |
| CN | 1543749 | 11/2004 |
| CN | 1555145 | 12/2004 |
| CN | 1753322 A | 3/2006 |

* cited by examiner

*Primary Examiner* — Chi H Pham
*Assistant Examiner* — Soon-Dong D Hyun
(74) *Attorney, Agent, or Firm* — Merchant & Gould P.C.

(57) ABSTRACT

The present invention discloses a method for suppressing cross-slot interference in a time-slotted CDMA system. The method includes: determining, by a base station, positions of cross slots according to configuration information of local cell and configuration information of co-frequency adjacent cells, and performing multi-cell channel estimation on the cross slots to obtain channel estimation results; determining, by the base station, code channel configuration information of the co-frequency adjacent cells, grouping the determined code channels and determining the code channels of the co-frequency adjacent cells involved in a joint detection; and performing, by the base station, the joint detection according to the multi-cell information estimation results and the determined code channels of the base stations involved in the joint detection to obtain detection data. With the present invention, interference from a base station transmitting downlink signals in cross slots to a base station receiving uplink signals in the corresponding slot may be reduced, and the system capacity and the stability may be improved.

32 Claims, 8 Drawing Sheets

| Cell Parameter ID | Related Code | | | |
|---|---|---|---|---|
| | SYNC-DL ID | SYNC-UL ID | Scramble ID | Base Midamble Code ID |
| 0 | 0 | 0...7 | 0 | 0 |
| 1 | | | 1 | 1 |
| 2 | | | 2 | 2 |
| 3 | | | 3 | 3 |
| 4 | 1 | 8...15 | 4 | 4 |
| 5 | | | 5 | 5 |
| 6 | | | 6 | 6 |
| 7 | | | 7 | 7 |
| .. | | | | |
| 124 | 31 | 248...255 | 124 | 124 |
| 125 | | | 125 | 125 |
| 126 | | | 126 | 126 |
| 127 | | | 127 | 127 |

Fig. 13

METHOD FOR RESTRAINING CROSS-SLOT INTERFERENCE IN SLOT CDMA SYSTEM

FIELD OF THE INVENTION

The present invention relates to a time-slotted CDMA system, particularly to a method for suppressing cross-slot interference in a time-slotted CDMA system.

BACKGROUND OF THE INVENTION

Since a time division duplex CDMA/TDMA mobile communication system may flexibly control and change the proportion between the length of uplink data transmission period and the length of downlink data transmission period, it is widely adopted for data transmission on asymmetrical services. Wherein, uplink/downlink services are carried in different time slots at the same carrier. The carrying capacity of uplink/downlink services may be flexibly adjusted by assigning amount of uplink/downlink time slots so as to match the proportion of uplink/downlink services. Thereby, the system capacity loss caused by asymmetry in services will be decreased to the minimum; the system capacity will be increased, and the optimal spectrum efficiency will be achieved.

However, in the case of co-frequency operation, if the division of time slots among adjacent cells is not the same, namely, adjacent cells adopt different uplink/downlink switching points, some time slots of adjacent cells may carry services in different directions, such time slots are called cross slots. So called cross-slot interference means that downlink or uplink signals in one cell may interfere to uplink or downlink signals in co-frequency adjacent cells. As shown in FIG. 1, time slots enclosed in the dashed block are used for uplink services in cell 1 and used for downlink services in cell 2. When a base station in cell 1 receives an uplink signal of cell 1, the base station may receive strong interference caused by downlink signals from a base station in cell 2, this kind of interference is called base station-to-base station cross-slot interference. For a terminal located at boundary between two cells, for example terminal A in cell 2, terminal A may receive interference caused by the uplink signal from terminal B in cell 1, this kind of interference is called terminal-to-terminal cross-slot interference. Due to large transmission power of base stations, high antenna gain and small path loss, the base station-to-base station interference is more significant. The base station-to-base station interference may cause that cells carrying uplink services in cross slots hardly work, which will seriously deteriorate the communication quality and system performance.

Conventionally, methods are provided to avoid cell-to-cell cross-slot interference. One method is that adjacent cells adopt the same frame synchronization and the same uplink/downlink time slot switching point under the control of a radio network controller (RNC). FIG. 2 is a flowchart showing a configuration method for adopting the same time slot switching point to avoid the cross-slot interference in prior art. However, since the asymmetry characteristics of uplink/downlink services is not exactly the same among different cells, the configuration method of the same switching point can not efficiently utilize spectrum resource by using this method. Another method is a configuration method of adopting different time slot switching points, when there are cross slots, RAN usually sacrifices capacity during allocating resources, namely, avoiding the use of cross slots. FIG. 3 is a flowchart showing a configuration method of sacrificing capacity adopted to avoid the cross-slot interference in prior art. However, both of the methods may not completely utilize the system resource.

Also, in prior art, according to a cell setup process shown in FIG. 4, RNC notifies certain base station (Node B) controlled by the cell of its own configuration information, such as cell ID, absolute frequency ID, maximum transmission frequency, synchronization channel configuration, configuration information of common channel carrying broadcasting information, time slot configuration information and the like, wherein the time slot configuration information related to the present invention include the number of time slots, time slot direction (uplink or downlink), and time slot state (activated or not). According to the cell setup process described above, the base station may determine a frame structure for the local cell, namely, the position of the time slot switching point. However, in existing systems, a base station may only obtain its own configuration information and may not acquire those of adjacent cells, so that the cross-slot interference may not be suppressed or eliminated by using a corresponding method. In existing time-slotted CDMA systems, joint detection technique is commonly used to suppress interference (mainly intersymbol interference and multi-access interference) to improve the performance of CDMA systems. The joint detection method is implemented by using information of all users' transmitting signals in the local cell and information of channel responses of these signals to regard the signal detection as a united and related joint detection process.

Existing receiver algorithms are mostly single cell joint detection algorithms. The algorithms only use the structure information (including spreading code and channel response) of users' transmitting signals in the local cell, and regards interference signals from other cells as white Gaussian noise over time. Therefore, single cell joint detection algorithms can efficiently suppress intersymbol interference and multi-access interference in the local cell.

A single cell joint detection process in a TD-SCDMA system is shown in details as following.

Firstly, a signal model received by a single cell receiver in a time-slot system is obtained:

$$e = Ad + n \qquad (1)$$

Where e represents sampling data for signals received by the receiver, d represents transmitting data, n represents received noise, and matrix A represents a transmission matrix. The transmission matrix A consists of combined channel impulse response $b^{(k)}$ of code channels, where k is code channel ID, it is supposed that there are L code channels in total (matrix A may be calculated by $b^{(k)}$, $b^{(k)}$ is one column in each block arranged on diagonal of the matrix, the detail calculation method refers to Chinese patent No. 02148622.0, entitled "Method of Applying Long Scrambling Code in Joint Detection System").

Each vector $b^{(k)}$ is a combined channel response corresponding to a code channel with the code channel ID of k:

$$b^{(k)} = C^{(k)} \oplus h^{(k)} \quad k=1 \ldots L \qquad (2)$$

Where $C^{(k)}$ is a spreading code of the code channel with the code channel ID of k, $\oplus$ is a convolution operator, $h^{(k)}$ is channel response of the code channel with the code channel ID of k, which is obtained by using a midamble (middle code) to perform the channel estimation.

Then, joint detection may be performed by using the above mentioned information. There are various joint detection algorithms that may be interference cancellation method, block linear equalization method, or a combination thereof.

For the block linear equalization method, the soft symbol estimated by transmitting data d after demodulation is:

$$\hat{d} = (T)^{-1} A^{*T} R_n^{-1} e \qquad (3)$$

Where matrix T is calculated with Formula (4):

$$T = \begin{cases} I & MF \\ A^{*T} R_n^{-1} A & ZF-BLE \\ A^{*T} R_n^{-1} A + R_d^{-1} & MMSE-BLE \end{cases} \qquad (4)$$

Where $A^{*T}$ is a conjugate transpose matrix of the transmission matrix A, and $R_d = E\{d \cdot d^{*T}\}$ is a covariance matrix of data sequence d, $d^{*T}$ is a conjugate transpose sequence of matrix d, in respect of data sequences which are independent to each other, $R_d = I$; $R_n = E\{n \cdot n^{*T}\}$ is a covariance matrix of noise sequence n, and $n^{*T}$ is a conjugate transpose matrix of matrix n. In respect of noise sequences which are stable and independent to each other (such as white noise), $R_n = \sigma^2 I$, where I represents a unit matrix.

Under the condition of $R_d = I$ and $R_n = \sigma^2 I$, formulas (3) and (4) may be simply represented as:

$$\hat{d} = (T)^{-1} A^{*T} e \qquad (5)$$

$$T = \begin{cases} I & MF \\ A^{*T} A & ZF-BLE \\ A^{*T} A + \sigma^2 I & MMSE-BLE \end{cases} \qquad (6)$$

MF in Formulas (4) and (6) is matched filtering, corresponding to matched filtering method; ZF-BLE is a Zero-Forcing Block Linear Equalization method, corresponding to a linear solution of the maximum likelihood; and MMSE-BLE is a Minimum Mean Square Error Block Linear Equalization method, corresponding to a linear solution of the minimum mean square error. One of the three methods described above may be chosen to solve T, and the second one ZF-BLE or the third one MMSE-BLE is usually chosen.

However, in the case of co-frequency networking, there is strong interference among signals of co-frequency adjacent cells that will significantly affect the system performance. Particularly, at the boundary between co-frequency adjacent cells, the co-frequency interference is usually the most important interference. Meanwhile, the single cell joint detection method may do nothing about the co-frequency interference among adjacent cells, if there is the co-frequency interference among adjacent cells, the system performance will be significantly deteriorated.

Focusing on the interference among co-frequency adjacent cells, in Chinese patent application No. 200410080196.6, entitled "Method for Multi-cell joint detection in time-slotted CDMA System" and filed by the same assignee of the present application, a method is proposed to use a channel estimation method for multiple code-sets (disclosed in Chinese patent application No. 03100670.1, entitled "Channel Estimation Method for Multiple Code-Sets in time-slotted CDMA System" and file by the same assignee of the present invention) to perform channel estimation on each adjacent cell, to adopt appropriate code channel grouping, and to implement joint detection according to the channel estimation result and the code channel grouping result. The multi-cell joint detection method fully utilizes structure information of signals from multiple cells to efficiently suppress multi-access interference among co-frequency adjacent cells, and the system performance of co-frequency adjacent cells is improved. However, since the cross-slot interference is not considered, in the case shown in FIG. 1, the method may not fully utilize the information provided by cross slots and may not achieve a good application effect.

SUMMARY OF THE INVENTION

The present invention aims at providing a joint detection method of suppressing base station-to-base station cross-slot interference to improve the system performance when the time-slotted CDMA system is operating in cross slots.

To reach the above objective, one aspect of the present invention provides a method for suppressing cross-slot interference in a time-slotted CDMA system, the method includes steps of:

determining, by a base station, positions of cross slots according to configuration information of local cell and configuration information of co-frequency adjacent cells, and performing multi-cell channel estimation on the cross slots to obtain channel estimation result;

determining, by the base station, code channel configuration information of the co-frequency adjacent cells, grouping the determined code channels and determining the code channels of the co-frequency adjacent cells involved in a joint detection; and performing, by the base station, the joint detection according to the multi-cell information estimation result and the determined code channels of the base stations involved in the joint detection to obtain the detection data.

Further, the step of obtaining, by the base station, the configuration information of the local cell and the configuration information of the co-frequency adjacent cells includes:

a radio network controller obtains the configuration information of the local cell to which the base station belongs and the configuration information of the co-frequency adjacent cells and notifies the base station about those information.

Further, the step of notifying the base station about the configuration information of the local cell and the configuration information of the co-frequency adjacent cells by the radio network controller is implemented by two messages.

Further, the step of notifying the base station about the configuration information of the co-frequency adjacent cells by the radio network controller is implemented through one of Iub interface NBAP signaling and an operation and maintenance signaling.

Further, the step of notifying the base station about the configuration information of the local cell and the configuration information of the co-frequency adjacent cells by the radio network controller includes:

extending configuration information of a base station of each cell by adding configuration information of the co-frequency adjacent cells; and notifying the base station about the configuration information of the local cell and the configuration information of the co-frequency adjacent cells through one message by the radio network controller.

Further, the step of notifying the base station about the configuration information of the local cell and the configuration information of the co-frequency adjacent cells through one message by the radio network controller is implemented through the Iub interface NBAP signaling.

Further, the configuration information of the co-frequency adjacent cells includes: time slot configuration information, distances from base stations in the co-frequency adjacent cells and the local base station or transmission delays of signals from the base stations in the co-frequency adjacent cells to the local base station, parameter IDs or basic midamble codes of the co-frequency adjacent cells, and time slot types adopted by downlink time slots, the time slot types comprise spreading factors, midambles K and the correspondences between spreading codes and cyclic shifts of the basic midamble codes.

Further, the step of performing, by the base station, the multi-cell channel estimation on the time slots to obtain the channel estimation result includes: the base station determines positions of the cross slots according to the time slot configuration information of the co-frequency adjacent cells, and then performs according to the basic midamble codes or basic midamble codes determined by the parameter IDs of the co-frequency adjacent cells, the multi-cell channel estimation on time slots having cross-slot interference by using a multi-cell channel estimation method to obtain the channel estimation result.

Further, the step of determining, by the base station, code channel configuration information of the co-frequency adjacent cells, grouping the determined code channels and determining the code channels of the co-frequency adjacent cells involved in the joint detection further includes: the base station according to the transmission delays from the base stations in the co-frequency adjacent cells to the local base station or obtained by the distances from adjacent base stations to the local base station, the midambles K, the spreading factors, the correspondences between the spreading codes and the cyclic shifts of the basic midamble codes and the channel estimation result, determines code channels used in the co-frequency adjacent cells or a maximum code channel set through an activation detection, wherein all code channels in the maximum code channel set are listed as code channels used in co-frequency adjacent cells.

Further, the configuration information of the co-frequency adjacent cells includes: time slot configuration information, distances from adjacent base stations to the local base station or transmission delays of signals from base stations in co-frequency adjacent cells to the local base station, parameter IDs or basic midamble codes of the co-frequency adjacent cells, spreading codes of the co-frequency adjacent cells, midambles K and the correspondences between the spreading codes and cyclic shifts of the basic midamble codes.

Further, the step of is performing, by the base station, the multi-cell channel estimation on the cross slots to obtain the channel estimation result includes: the base station determines the positions of the cross slots according to the time slot configuration information, and then performs according to the basic midamble codes or basic midamble codes determined by parameter IDs of the co-frequency adjacent cells, the multi-cell channel estimation on time slots having cross-slot interference by using a multi-cell channel estimation method to obtain the channel estimation result.

Further, the step of determining, by the base station, code channel configuration information of the co-frequency adjacent cells, grouping the determined code channels and determining the code channels of the co-frequency adjacent cells involved in a joint detection further includes: the base station determines code channel configuration information of the adjacent cells according to the spreading codes used in the co-frequency adjacent cells, midambles K, the correspondences between the spreading codes and cyclic shifts of the basic midamble codes, so as to determine code channels used by the co-frequency adjacent cells.

Further, in a TD-SCDMA system, the configuration information of the co-frequency adjacent cells further comprise scrambling codes, the scrambling codes are obtained through the basic midamble codes or parameter IDs of adjacent cells.

Further, the correspondences between the spreading codes and the cyclic shifts of the basic midamble codes adopt a mode defined by default mode in 3GPP25.221.

Further, the time slot configuration information includes: co-frequency adjacent cell IDs, time slot IDs of cross slots between the co-frequency adjacent cells; or the co-frequency adjacent cell IDs, and the time slot IDs and uplink/downlink directions of time slots.

Further, the transmission delays are obtained by measuring pilot signals of the co-frequency adjacent cells by the base stations according to a configured measurement command.

Further, the base station groups the determined code channels of the co-frequency adjacent cells based on cells to which the code channels belong, the number of code channel groups equals to the number of the co-frequency adjacent cells, the code channels in each group are code channels of a corresponding cell.

Further, the base station groups the determined code channels of the co-frequency adjacent cells based on amplitude or power of the code channels, the code channels are grouped into the code channel group involved in the joint detection and interference code channel group according to amplitude or power of the code channels.

Further, grouping the code channels according to the amplitude or power of the code channels includes estimating the amplitude or power of each code channel signal according to the channel estimation result of the adjacent cells or the combined channel response of the code channels obtained from the channel estimation result of the adjacent cells; and dividing the code channels to be detected and the interference code channels with amplitude or power larger than a threshold to the code channel group involved in the joint detection, the interference code channels without users to be detected and with amplitude or power less than the threshold to the interference code channel group.

Further, the base station groups the determined code channels of the co-frequency adjacent cells to the code channel group involved in the joint detection and the interference code channel group according to values of coherences between the code channels.

Further, grouping according to the coherences between the code channels includes estimating the coherences between the code channels in the multi-cell signal according to the channel estimation result of the adjacent cells or the combined channel response of the code channels obtained from the channel estimation result of the adjacent cells and dividing the code channels to be detected and the interference code channels with the coherence larger than a threshold to the code channel group involved in the joint detection, the interference code channels without users to be detected and with the coherence less than the threshold to the interference code channel group.

Further, the coherences between the code channels comprise an average coherence, the maximum coherence and the minimum coherence, one is chosen for the grouping.

Further, when the base station performs the joint detection according to the multi-cell channel estimation result and the determined code channels involved in the joint detection of the base stations, the determined code channels involved in the joint detection of the base stations are the remaining activated code channels after matched filtering and activation detection from the chosen code channels involved in the joint detection of the base stations.

Further, the method adopted by the base station to perform the joint detection according to the multi-cell channel estimation result and the determined code channels involved in the joint detection of the base stations is: the base station adopts a single cell "block linear equalization" within each group, and adopts an "interference cancellation" among groups.

Further, the method of adopting the single cell "block linear equalization" within each group and adopting the "interference cancellation" among groups further includes:

performing the single cell joint detection on each group respectively to obtain the detection result of each group;

when the times of interference cancellation reaches predetermined times, outputting the detection result of the group where users to be detected locate;

when the times of interference cancellation does not reach the predetermined times, recovering interference component caused by the channel responses according to the detection result of each group, and cancelling interference component out of the current group with a received signal to obtain a net signal, the net signal being regarded as the grouping result for the next step.

Further, the step of performing the single cell joint detection on each group respectively to obtain the detection result of each group includes:

calculating the combined channel response of the code channels by using the channel estimation result of the adjacent cells;

constructing a transmission matrix of the adjacent cells from the combined channel response; and performing matched filtering on data divided from the receiving signal, and performing the single cell "block linear equalization" to the matched filtering result to obtain the joint detection result of each group.

Further, the step of performing the matched filtering on data divided from the receiving signal and performing the single cell "block linear equalization" on the matched filtering result to obtain the joint detection result of each group further includes:

performing activation detection on the matched filtering result; reconstructing the transmission matrix according to the activation detection result; and performing the single cell "block linear equalization" to obtain the combined detection result of each group.

Further, the method adopted by the base station to perform the joint detection according to the multi-cell channel estimation result and the determined code channels involved in the joint detection of the base stations is: a joint detection method of performing the block linear equalization on the code channel group involved in the joint detection.

Further, the joint detection method of performing the block linear equalization on the code channel group involved in the joint detection further includes:

constructing a transmission matrix of the code channel group involved in the joint detection and a transmission matrix of the interference code channel group by using the combined channel response of the code channels;

performing the matched filtering between the transmission matrix of code channel group involved in joint detection, a covariance matrix of colored noise interference and the data divided from the receiving signal; and performing the joint detection on the matched filtering result by using the joint detection algorithm of block linear equalization, and outputting soft symbol estimated by obtained transmitting data as the detection data.

Further, the covariance matrix of the colored noise interference is obtained by calculating the transmission matrix of the interference code channel group and the background noise.

Further, the covariance matrix of the colored noise interference is obtained by processing the co-frequency inference in the interference code channel group regarding as white noise, the processing includes: summing up power of each code channel in the interference code channel group; and summing up the power sum and power of background noise.

Further, the step of performing the joint detection on the code channel involved in the joint detection by using the joint detection method of block linear equalization further includes:

constructing the transmission matrix of the code channel group involved in the joint detection and the transmission matrix of the interference code channel group by using the combined channel response of the code channels;

performing the matched filtering between the transmission matrix of the code channel group involved in the joint detection, a covariance matrix of colored noise interference and the data divided from the receiving signal;

performing an activation detection on the outputted matched filtering result by the base station, and reconstructing a transmission matrix according to the activation detection result; and performing the joint detection on the transmission matrix reconfigured according to the activation detection result by using the joint detection algorithm of block linear equalization, and outputting soft symbol estimated by obtained transmitting data as the detection data.

The present invention utilizes the information provided in cross slots to more accurately group code channels, so that multi-cell joint detection method may efficiently suppress base station-to-base station cross-slot interference, the system capacity and stability may be improved when the time-slotted CDMA system is operating in cross slots.

BRIEF DESCRIPTION OF THE DRAWINGS

FIG. 13 is correspondences between cell parameter IDs and uplink/downlink synchronization codes, scrambling codes, and basic midamble codes in 3GPP 25.221.

DETAILED DESCRIPTION OF THE INVENTION

Figure 6:
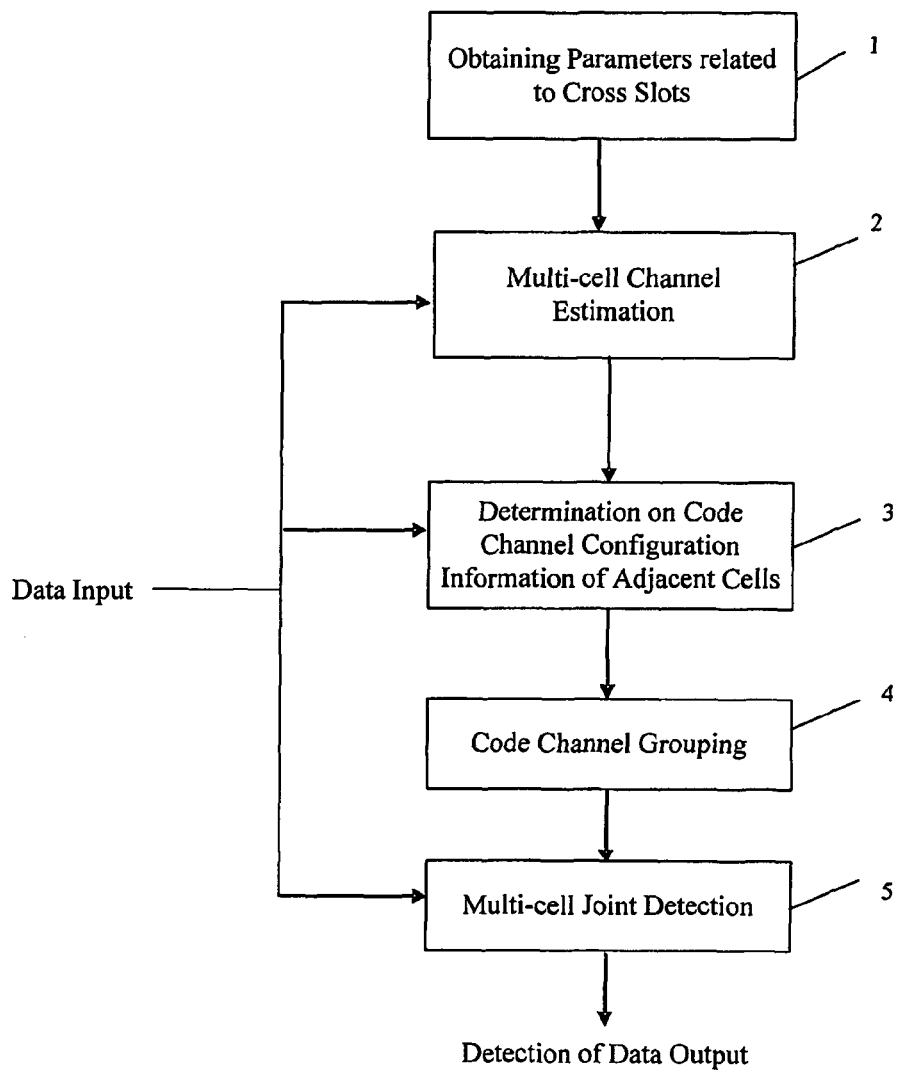
FIG. 6 is a flowchart showing a method for suppressing cross-slot interference in a time-slotted CDMA system according to one embodiment.

The present invention will be described in details referring to the accompanying drawings. The accompanying drawings are used to explain and but not to limit the present invention. As shown in FIG. 6, the joint detection method for suppressing cross-slot interference provided in the present invention includes steps as follows.

In step 1, a base station in the local cell obtains configuration information of its own and co-frequency adjacent cells.

The cross-slot interference is a main limitation for flexible configuration of adjacent switching points. In order to get rid of the cross-slot interference, the existing signaling should be modified, for example, a base station may not only obtain its own configuration information, but also obtain some necessary configuration information of adjacent cells by adding information or extending contents of existing information, so that the base station may suppress the cross-slot interference.

According to different requirements, contents of configuration information for co-frequency adjacent cells may be different. In the first way, configuration information of co-frequency adjacent cells include basic midamble codes or parameter IDs of the co-frequency adjacent cells, distances from the adjacent base stations to the local base station or transmission delay of signals from the adjacent base stations to the local base station, time slot configuration information for the co-frequency adjacent cells (such as uplink/downlink switching points), spreading factors SF, midambles K, and correspondences between spreading codes and cyclic shifts of the basic midamble codes; in the second way, configuration information of the co-frequency adjacent cells include a basic midamble code or parameter IDs of the co-frequency adjacent cells, time slot configuration information of the co-frequency adjacent cells (such as uplink/downlink switching points), distances from the adjacent base stations to the local base station or transmission delays of signals from the adjacent base stations to the local base station, spreading codes used in the adjacent cells, midambles K, and correspondences between spreading codes and cyclic shifts of the basic midamble code.

RNC may do configuration by using a method as following: after a base station is put to use and RNC successfully implements a cell setup configuration for base stations under its control, namely, after the base stations determine their own uplink/downlink switching points, RNC determines whether there are cross slots among adjacent base stations or not, if it is determined that there are cross slots among adjacent cells, there is a process to add information from RAN to the base stations to indicate necessary information to the base stations, so that the base stations may suppress the cross-slot interference according to their own information obtained originally and the indicated information. An operation and maintenance signaling may be adopted to add the information, also an Iub interface NBAP signaling may be adopted to add the information, and the present invention will not limit specified methods to add the information. Meanwhile, after cell configuration information has been changed, RNC should support a reconfiguration process and notify a base station to update information so as to make sure efficiently eliminating the interference. The reconfiguration process includes reconfiguring uplink/downlink time slots according to changes of service characteristics of the cells, then notifying the base stations about the changes of their own configurations, and notifying the base stations having cross slots about the reconfiguration information of adjacent cells. The present invention provides related information necessary to eliminate the cross-slot interference with the method of adding information, so that the system needs not to consider the limitation of not using cross slots during a resource allocation. The method includes the detail processes 1-4 as follows.

1. RNC determines time slot configuration (such as uplink/downlink switching point) for each cell under its control according to the service characteristics of each cell.

2. RNC notifies the base stations under its control about the time slot configuration of each cell through a cell setup process.

Figure 7:
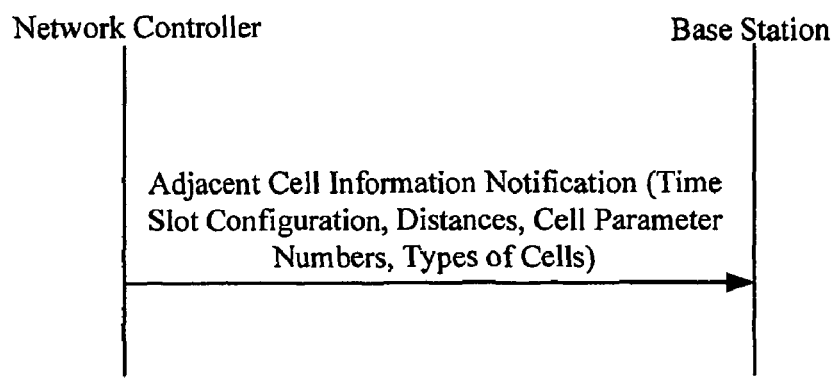
FIG. 7 is a schematic diagram showing an information configuration process of an adjacent cell according to the present invention.

3. RNC determines whether there are cross slots or not according to the time slot configuration for each cell under its control, if it is determined that there are cross slots, namely, there is the cross-slot interference from adjacent base stations, as shown in FIG. 7, RNC notifies the base stations about the configuration information of co-frequency adjacent cells, so that the base stations may determine that the interference is from UEs of the adjacent base stations or from UEs of the adjacent cells; if it is determined that there are not cross slots, then RNC notifies the base stations about the corresponding information by using the methods in prior art, then a joint detection is performed with the methods in prior art, the present invention will not describe this case in detail.

Wherein, the configuration information of co-frequency adjacent cells notified to the base stations include the following information a and b.

Information a. time slot configuration information for co-frequency adjacent cells, which is used for the base station in the local cell to determine whether there is the cross-slot interference, and the position of the cross-slot interference. Wherein, the most important one in the time slot configuration information is the uplink/downlink switching points of co-frequency adjacent cells. In addition, the time slot configuration information of the co-frequency adjacent cells may include adjacent cell IDs and time slot IDs having cross slots in the adjacent cells, at this time, the base station in the local cell needs not to determine the cross-slot interference and the position thereof; the time slot configuration information of the co-frequency adjacent cells may further include adjacent cell IDs, time slot IDs of time slots and uplink/downlink directions thereof, at this time, the base station in the local cell determines whether there is the cross-slot interference or not and the position thereof according to the time slot IDs of time slots of the corresponding adjacent cells and the uplink/downlink directions thereof.

Information b. some other information supporting the base stations in the co-frequency adjacent cells to adopt an extended joint detection technique, the information mainly includes the following parameters I-III:

Parameter I: transmission delays of signals from adjacent base stations to the local base station After setting up a network, distances between base stations are determined, therefore, the transmission delays may be obtained according to the distances between the base stations, then the delays are directly notified to the local base station, or only the distances from the local base station to the adjacent base stations may be notified to the local base station, and the transmission delays are calculated by each base station according to the distances; certainly, other methods may be applicable, for example, the base stations measure pilot signals of the base stations in adjacent cells by itself to obtain the transmission delays, however, pilot codes SYNC used by the base stations in the adjacent cells is necessary, this information, similarly to the midamble code, may be obtained through cell parameter IDs. Therefore, the base stations may obtain the transmission delays of signals from the adjacent base stations to the local base station through the measurement by itself with the notified parameter IDs of the adjacent cells. The transmission delays are used to more accurately intercept channel responses of code channels from overall channel responses in a channel estimation result, so that code channels or maximum sets of the code channels used by the adjacent cells may be more accurately determined.

Parameter II: scrambling codes or basic midamble codes used by adjacent cells

RNC may directly notify scrambling codes or basic midamble codes to the base stations, or only notify cell parameter IDs to the base stations, each base station obtains a scrambling code or a basic midamble code according to the cell parameter IDs. Usually, there are fixed correspondences among the cell parameter IDs, the scrambling codes and the basic midamble codes, so that the content indication requiring less transmission information may be chosen by considering of decreasing signaling load.

Parameter III: spreading factors and midambles K used for downlink time slots of adjacent cells, and the correspondences between spreading codes and cyclic shifts of the basic Midamble codes.

When there are cross slots, predetermined types of time slots adopted by adjacent cells in the downlink time slot, that is, the spreading factors and midambles K, and the correspondences between the spreading codes and the cyclic shifts of the basic midamble codes should be determined and notified to the base stations. Herein, the correspondences between spreading codes and cyclic shifts of the basic midamble codes adopt default correspondences or predetermined correspondences. The spreading factors and midambles K used by the adjacent cells in the downlink time slot, and the correspondences between the spreading codes and cyclic shifts of the basic midamble codes are used to perform the extended joint detection.

When adopting the second way mentioned above, in the case of directly notifying the spreading codes of the co-frequency adjacent cells, the information provided in information b are different in newly added information IV of spreading codes of the co-frequency adjacent cells; in addition, the spreading factors are not provided in the parameter III.

4. RNC allocates resource according to service characteristics of cells without considering avoiding the cross-slot interference.

Figure 8:
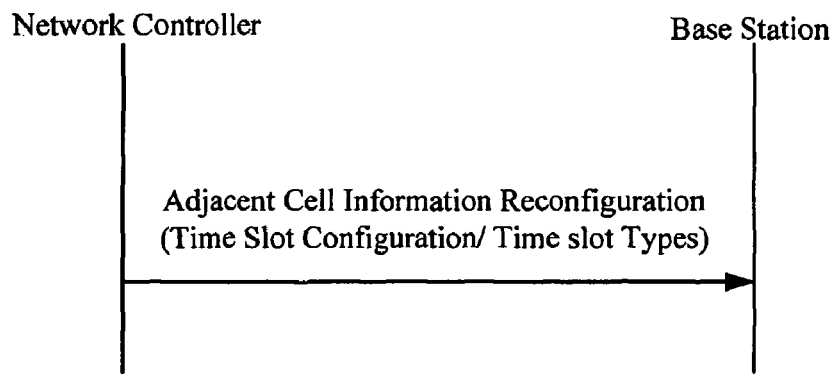
FIG. 8 is a schematic diagram showing an adjacent cell information reconfiguration process according to the present invention.

When the information in the process 3 has changed, RNC repeats the above processes 1-4 to reconfigure the cells, the updated information of the local cell and co-frequency adjacent cells are notified to the base stations having cross slots. Since the TDD system may flexibly configure the time slot switching points according to the uplink/downlink services, among the information, the time slot configuration information of the adjacent cells and the types of downlink time slots are frequently changed. Therefore, in order to reduce signaling load, the reconfiguration process may only includes the time slot configuration information and the types of time slots. In FIG. 8, a reconfiguration process is shown that RNC provides an updated time slot configuration and types of time slots to the base stations to reconfigure the configuration information of the adjacent cells by adding reconfiguration information.

The above described method of the present invention is to add an adjacent cell information configuration process with the current time-slot CDM system protocol unchanged, which is more feasible.

In addition, other methods may be applicable. For example, according to the method of the present invention, RNC may determine cross slots right after it determines the uplink/downlink time slot configuration of each cell under its control according to service characteristics of each cell. For the base stations without cross slots, RNC notifies the base stations of the cells under its control about their own configuration information through the cell setup process. For the base stations with cross slots, RNC notifies the base stations of the cells under its control about their own configuration information through the cell setup process, after the cell setting up is finished, RNC notifies the base stations about the configuration information of their adjacent cells through an adjacent cell setup process; or, RNC extends the cell configuration information by adding the adjacent cell configuration information, so as to notify the base stations of the cells under its control about their own configuration information and the configuration information of their adjacent cells through the cell setup process. When the time slot configuration of the cells is changed, the above processes are repeated and RNC performs the reconfiguration process.

In addition, according to the method of the present invention, RNC may not determinate cross slots, extend the cell configuration information by adding the configuration information of adjacent cells so as to notify the base stations of the cells under its control about their own configuration information and the configuration information of their co-frequency adjacent cells through the cell setup process, or notify the base stations of the cells under its control about their own configuration information through the cell setup process and the configuration information of their adjacent cells through the adjacent cell setup process. However, since each base station is notified about the configuration information of its cell and its adjacent cells, the transmission information amount will be huge and signaling lode will be huge too. In this method, whether there are cross slots or not and the positions of the cross slots are determined by the base stations in the cells according to the obtained their own configuration information and the configuration information of their adjacent cells. When the cell time slot configuration changes, the above processes are repeated and RNC performs the reconfiguration.

In the above first method, the spreading factors SF, the midambles K, and the correspondences between spreading codes and cyclic shifts of the basic midamble codes are used to determine the code channel configuration information of adjacent cells in conjunction with multi-cell channel estimation results. In the above second method, the spreading codes, the midambles K and the correspondences between spreading codes and cyclic shifts of the basic midamble codes which are used by the adjacent cells are used to determine the code channel configuration information of the adjacent cells.

Step 2, Multi-Cell Channel Estimation.

Since in the case of co-frequency, midamble codes of multiple cells will be mixed together, which causes interference and worsens the channel estimation result. Therefore, Chinese patent application No. 03100670.1, entitled "Channel Estimation Method for Multiple Code Sets" may be used to obtain the channel estimation result of the adjacent cells and improve the accuracy of the channel estimation.

The adjacent cell configuration information is necessary for the multi-cell channel estimation, wherein training sequences (namely, the midamble codes, also called "the channel estimation codes") used by adjacent cells are relatively important, such as the middle codes. The training sequence is generated as following: a basic midamble code $m_p$ is given to the same time slot of the same cell, different users use different cyclic shifts of the same midamble code $m_p$ as their training sequences $m_p^{(k)}$, where k=1, ..., K. The different cyclic shifts of those training sequences $m_p^{(k)}$, k=1, ..., K, are called as a code set, multiple cells have multiple code sets.

In Chinese patent application No. 03100670.1, entitled "Channel Estimation Method for multiple code sets", after the basic midamble code used by the adjacent cells is obtained, in the case that there are response signals for multiple code-set channel estimation code (namely, received signals of the midamble codes, abbreviated as "multiple code-set signal") during operations of multiple co-frequency cells, a method for multiple code-set iterative channel estimation base on finite time and position decision feedback is adopted to perform the channel estimation for multiple midamble codes at the same time and to obtain channel estimation results of respective cells. Interference from each midamble code may be calculated according to the known midamble codes and their corresponding channel estimation results. After a threshold process and multiple iterations, the channel estimation value of each cell is obtained with interference eliminated and in relatively high accuracy, so that the channel estimation result is more accurate. Wherein, multiple cells on which the channel estimation is performed are adjacent cells, the adjacent cells include the local cell at which the user to be detected locates and adjacent cells which are most close to the local cell.

In addition, the channel response $h^{(k)}$ of each code set may be more accurately positioned and extracted during the above multiple code-set channel estimation process by using the transmission delay information obtained in Step 1, so that the accuracy of the single code set channel estimation of each cell will be improved and the accuracy of the multiple code-set channel estimation result will be further improved.

Wherein, according to the method for performing the channel estimation in the time-slot CDAM system, namely, Steiner estimator, referring to Document 1 (B. Steiner, and P. W. Baier, "Low Cost Channel Estimation in the Uplink Receiver of CDMA Mobile Radio Systems," FREQUENZE, 47 (1993)11-12), the channel response of each code channel $h^{(k)}$ is:

$$h^{(K)} = (h_1^{(k)}, h_2^{(k)} \ldots, h_W^{(k)})^T$$

Where the length of window W represents time width of the channel response, superscript T represents transpose. The channel response vector is denoted by values on W taps spaced with chips.

Certainly, if there is not a high requirement for the results, the multi-cell channel estimation may use the single cell channel estimation method proposed in the above Document 1 to perform the single cell channel estimation for each cell to obtain the channel estimation result for each cell, namely, the channel response $h^{(k)}$ of code channels of each cell.

Step 3, determining the code channel configuration information of the co-frequency adjacent cells to determine the code channels involved in the following code channel groupings.

In a first method, spreading codes of the co-frequency adjacent cells are directly obtained through the Iub interface NBAP signaling or the operation and maintenance signaling notification, then the code channel configuration information of the corresponding adjacent cells is obtained according to the corresponding midambles K, and the correspondences between the spreading codes and cyclic shifts of the basic midamble codes, where the code channels corresponding to the spreading codes of the adjacent cells are all involved in the code channel grouping.

In a second method, the code channel adjacent cell configuration information is obtains based on the determination on the multi-cell channel estimation result. According to the multi-cell channel estimation result obtained in Step 2 (namely, the overall channel response vector of the adjacent cells) and the transmission delays obtained in Step 1, the channel response of each code channel is determined from the overall channel response vector. If the spreading factors are known, since there is a certain correspondence between the cyclic shift of the basic midamble code and the channel response of each code channel, the code channels or the maximum set of the code channels used in the adjacent cells may be determined through the channel response of each code channel, so that the spreading code of each code channel (used or may be used) is obtained, the code channel configuration information of each adjacent cell is obtained. When the channel response corresponds to the code channel for each code channel, the code channel configuration information of each adjacent cell may be determined. When the channel response does not correspond to the code channel for each user, the maximum set of the code channels used in an adjacent cell is obtained. At this time, each code channel in the maximum set of the code channels is regarded as a used code channel.

Step 4, Code Channel Grouping

Since there are a large number of code channels in multiple co-frequency adjacent cells, in order to implement the joint detection with a low cost and good performance, the code channels of the adjacent cells obtained in Step 3, which are involved in the code channel grouping, are grouped. The detail schemes of the code channel grouping are as following.

The first scheme is a grouping method based on cells to which the code channels belong. The number of co-frequency cells equals to the number of groups, then the code channels in each group are the code channels of a corresponding cell.

In the case that the spreading codes used in the co-frequency adjacent cells are directly obtained through the Iub interface NBAP signaling or the operation and maintenance signaling, the code channels involved in the code channel grouping are the code channels predetermined by each adjacent cell. In the case that the code channel configuration information of the adjacent cells is obtained based on the multi-cell channel estimation, the code channels involved in the code channel grouping may be the obtained code channels or the maximum set of the code channels of the adjacent cells. Wherein, when the maximum set of code channels is obtained, all code channels in the maximum set may be all involved in the code channel grouping.

Groups obtained from the code channel grouping by using the above scheme are all chosen to be involved in a joint detection, or are partly chosen to be involved in the joint detection.

The second scheme is a grouping method based on power or amplitude of code channels. The power (calculated by squaring the amplitude) or the amplitude of signal of each code channel may be estimated by the channel response $h^{(k)}$ of each code channel obtained from the overall channel response vector which is obtained from the multi-cell channel estimation result or by the combined channel response $b^{(k)}$ of each code channel obtained according to formula (2) from the channel response $h^{(k)}$ of each code channel and the spreading code of each code channel obtained form Step 3. Then code channels are grouped according to amplitude or power. For example, a threshold is set for amplitude or power, if amplitude or power of a code channel is greater than the threshold, amplitude or power of the code channel is strong; if amplitude or power of a code channel is less than the threshold, amplitude or power of the code channel is weak; code channels with strong amplitude or power are one group, code channels with weak amplitude or power are another group.

The third scheme is a grouping method based on coherence between code channels. Firstly, the coherences between the code channels in multi-cell signal are estimated by the channel response $h^{(k)}$ of each code channel obtained from multi-cell channel estimation result or by the combined channel response $b^{(k)}$ of each code channel obtained according to formula (2) from the channel response $h^{(k)}$ of each code channel and the spreading code of each code channel obtained form Step 3. Then all code channels are grouped according to coherences. For example, a threshold is set for coherence, if the coherence between the code channels is greater than the threshold, the coherence between the code channels is strong; if the coherence between the code channels is less than the threshold, the coherence between the code channels is weak; code channels with strong coherence are one group, code channels with weak coherence are another group. Coherence among multiple code channels may be an average coherence, the maximum coherence or the minimum coherence.

Code channels may be grouped by the mixed one of above schemes or by other rules.

Step 5, joint detection. By using the above multi-cell channel estimation result, the joint detection result is obtained by joint detecting all code channels in the local cell and the code channels of adjacent cells which are determined in Step 4 to be involved in the joint detention.

As described in background of the present application, the joint detection method may be an interference cancellation method, a block linear equalization method, or a combination of the interference cancellation method and the block linear equalization method. For example, the block linear equalization method may be used within each group, and the interference cancellation method may be used among different groups.

Specifically, in the joint detection method of the present invention, in respect to the code channels to be involved in the joint detection after the code channel grouping, a matched filtering should be performed to the code channels before the joint detection, then an activation detection should be performed to the code channels, the remaining activated code channels after the activation detection are regarded as the code channels involved in the joint detection.

The method in the present invention is described in detail by taking the TD-SCDMA system as an example.

The TD-SCDMA system is a time division CDMA system, in a sub-frame, the first time slot is always a downlink time slot, which is used to transmit broadcasting information and the like. The second time slot is an uplink time slot, uplink/downlink switching points of the remaining time slots may be changed. The present application only considers the base station-to-base station cross-slot interference, namely, only considers the interference from downlink signals of base stations in co-frequency adjacent cells to an uplink signal received by the base station in the local cell. It is supposed that there is certain correspondence between a spreading code and a cyclic shift of the basic midamble code, and the spreading codes of the adjacent cells are obtained by directly notifying through the Iub interface NBAP signaling or the operation and maintenance signaling.

Figure 9:
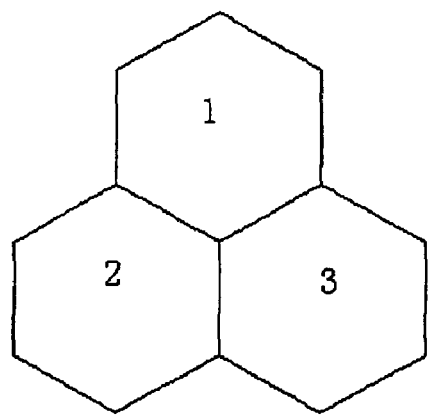
FIG. 9 is a diagram showing a distribution structure of three co-frequency adjacent cells.
Figure 10:
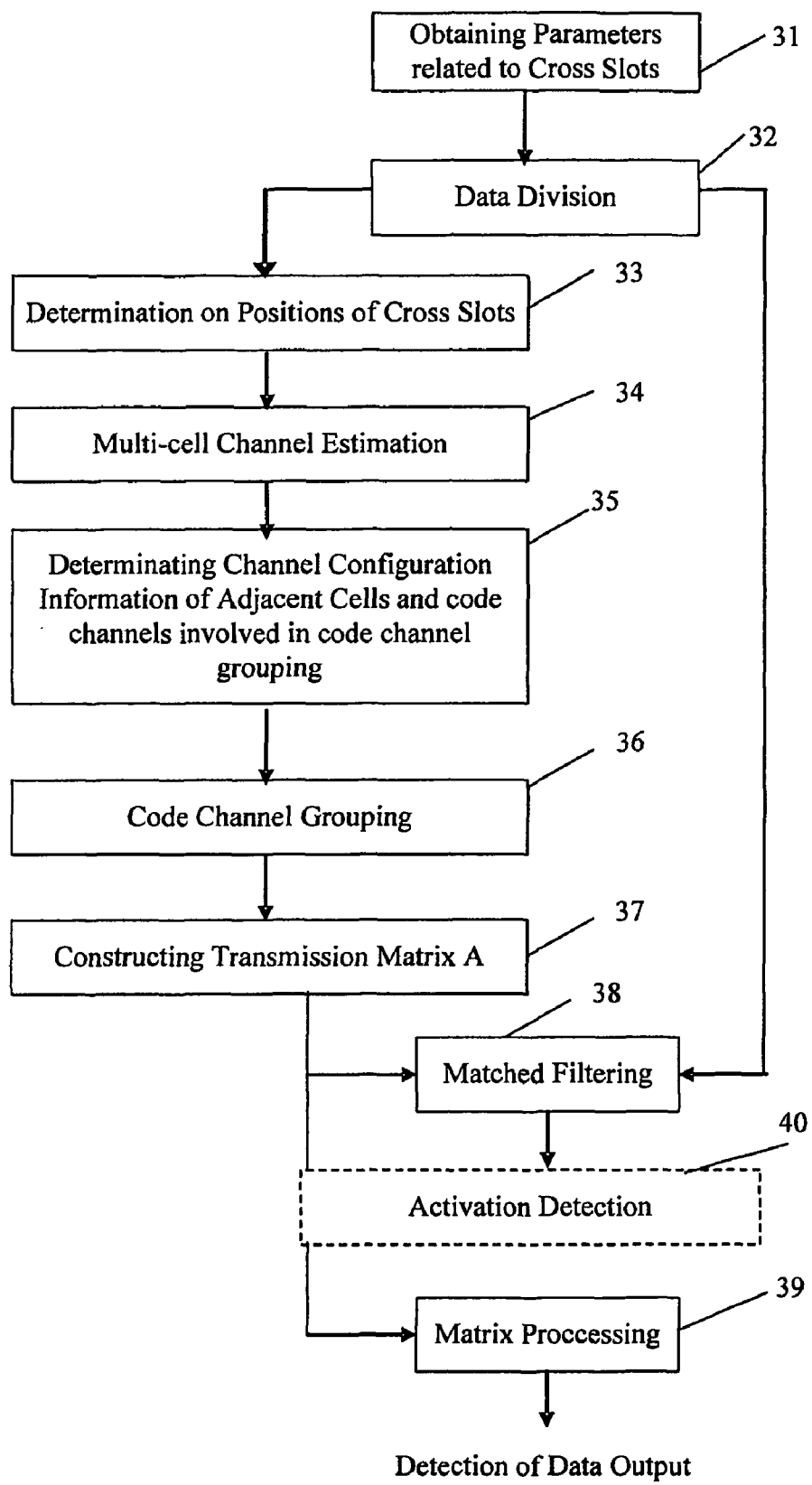
FIG. 10 is a flowchart showing a joint detection for suppressing cross-slot interference in a time-slotted CDMA system according to an embodiment.

The implementation of the present invention is described in detail referring to FIG. 10 and taking three co-frequency adjacent cells shown in FIG. 9 as an example. According to the theory of Formula (1), the multi-user signal e of the local cell and two co-frequency adjacent cells may be denoted as:

$$e = A_0 d_0 + \sum_{i=1}^{2} A_i d_i + n_0 \tag{7}$$

Where $A_0$ and $d_0$ are a transmission matrix and transmitting data of users in the local cell respectively; $A_i$ and $d_i$ are a transmission matrix and transmitting data of ith (i=1, 2) adjacent cell respectively; $n_0$ is power of interference and noise (such as white noise) after eliminating interference from the two adjacent cells.

Step 31, the base station in the local cell obtains configuration information of the local cell and the co-frequency adjacent cells, wherein the configuration information of the co-frequency adjacent cells is obtained by the Iub interface NBAP signaling or the operation and maintain channel. The configuration information of the co-frequency adjacent cells include: the basic midamble codes, the scrambling codes, midambles K (namely, the number of channel responses of code channels in one time slot), spreading factors, the correspondences between the spreading codes and cyclic shifts of the basic midamble codes, the transmission delays of signals from the base stations in the adjacent cells to the base station of the local cell, and the time slot configuration of the adjacent cells (mainly uplink/downlink switching points). Wherein the basic midamble codes, the scrambling codes are corresponding to cell parameter IDs, as shown in FIG. 13, therefore, they may be obtained according to the notified cell parameter IDs.

Figure 11:
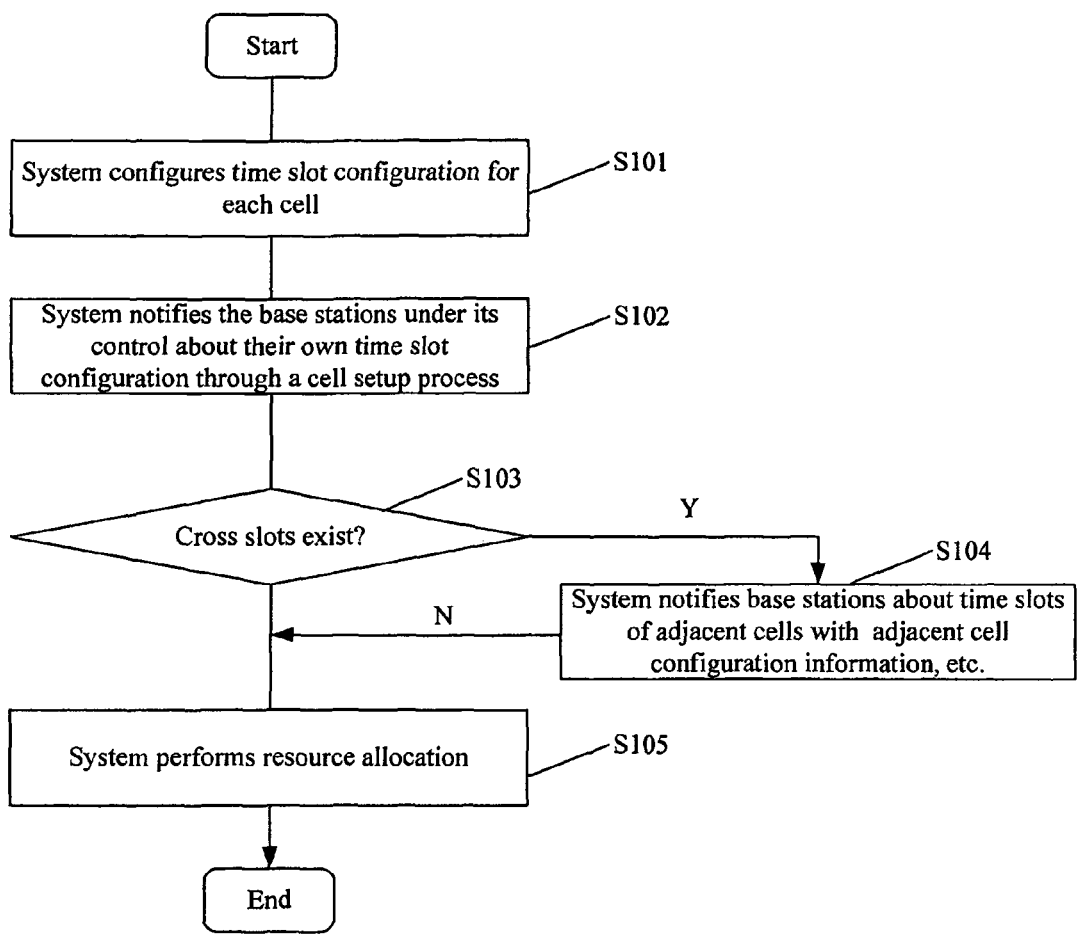
FIG. 11 is a flowchart showing a process in which RNC configures information to a base station according to an embodiment of the present invention.

As shown in FIG. 11, this step may be implemented by the following steps.

Step S101, Radio Network Controller (RNC) configures the time slot configuration (such as the uplink/downlink switching points) of each cell under its control according the service characteristics of the cell (such as network performance index, system load and service ratio and the like), namely, the ratio between uplink time slots and downlink time slots within a frame, so that the direction of each time slot is determined.

Figure 1:
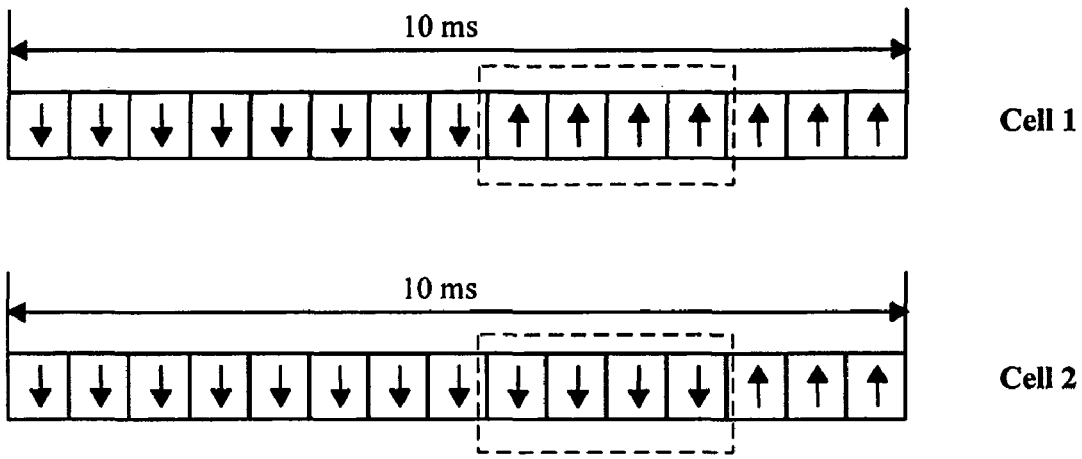
FIG. 1 is a diagram showing a time slot configuration of two cells having cross slots.
Figure 2:
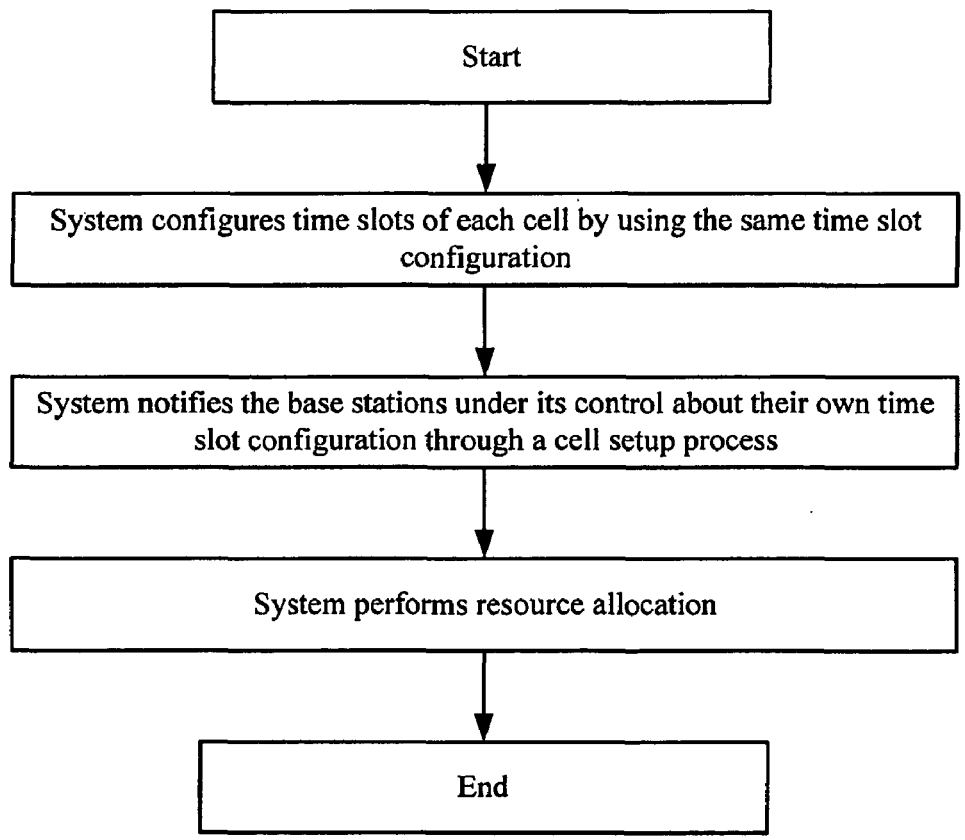
FIG. 2 is a flowchart showing a configuration method of adopting the same time slot switching point to avoid cross-slot interference according to prior art.
Figure 3:
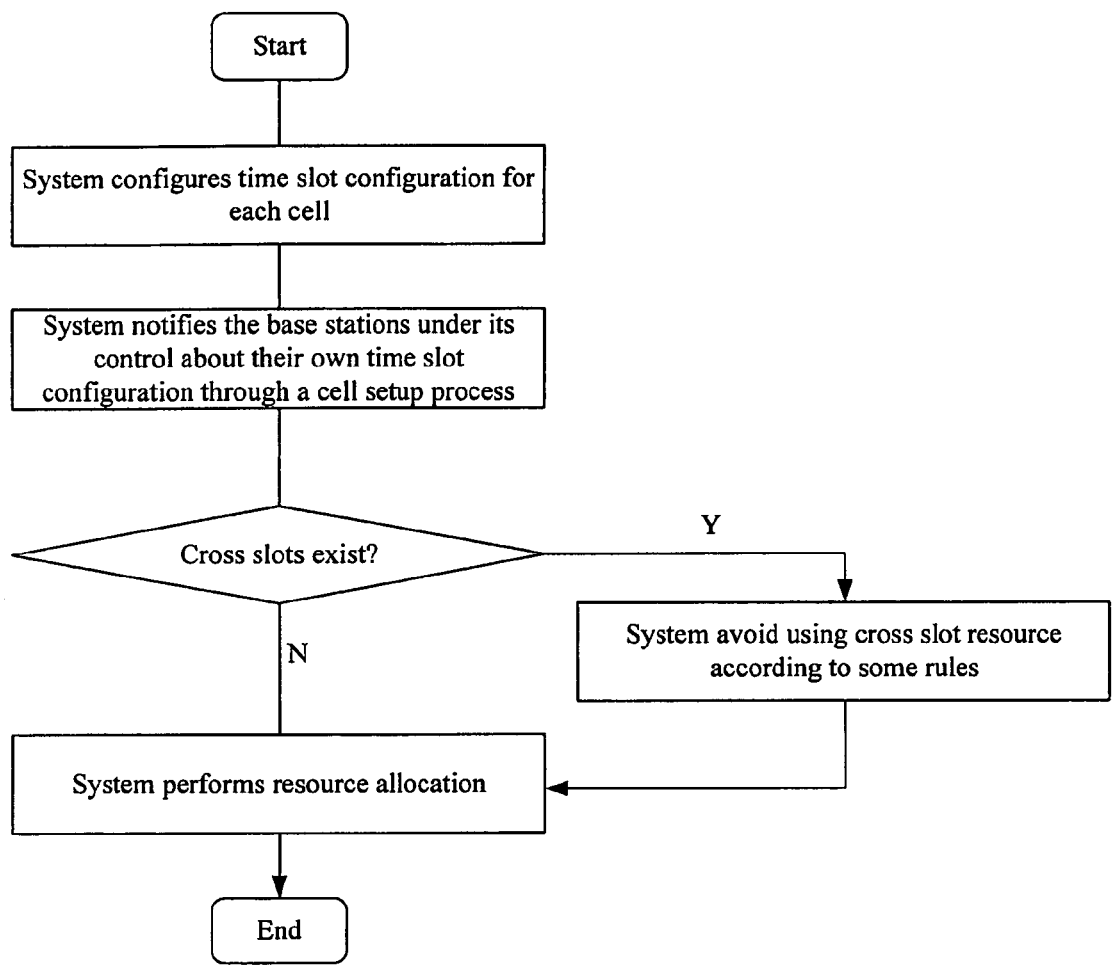
FIG. 3 is a flowchart showing a configuration method of sacrificing capacity to avoid cross-slot interference according to prior art.
Figure 4:
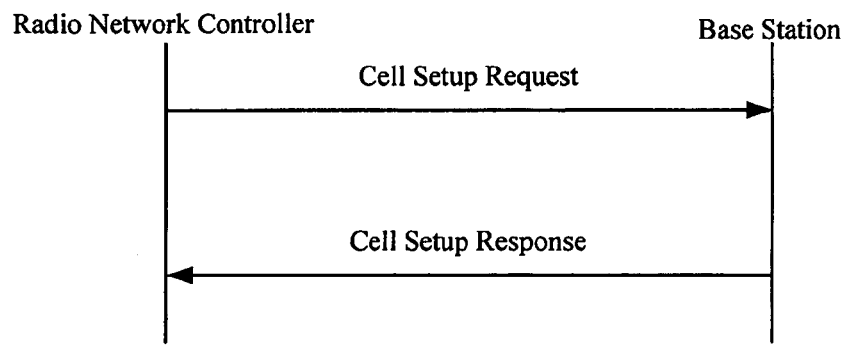
FIG. 4 is a flowchart showing a cell setup process according to prior art.

Step S102, RNC sets up a cell in Node B by a cell setup request shown in FIG. 4, a cell setup response message is replied to RNC from Node B after Node B keeps necessary resource and configures the new cell according to parameters in the cell setup message. Through the cell setup process, RNC sequentially sets up cells under its control and configures the cell IDs, the absolute frequency of radio channel numbers, the maximum transmission powers, the synchronized channel configuration, the configuration information of the common channel carrying broadcasting, the time slot configuration information and the like.

Step S103, RNC determines whether there are cross slots among the cells or not;

Step S104, if there are not cross slots, RNC notifies the base station about the corresponding information with a method in prior art, then performs the joint detection with a method in prior art, the present invention will not describe this case in detail; if there are cross slots, RNC notifies the base station in the local cell about the configuration information of the co-frequency adjacent cells through an adjacent cell configuration process. The adjacent cell configuration information includes:

I) transmission delays from adjacent base stations to the local base station. Generally, there are six base stations in cells adjacent to one base station. After the network architecture is determined, the locations of base stations in a cell are fixed, there is small probability to change the distances between base stations. A base station may obtain signal transmission delay according to the distance to an adjacent base station.

II) the scrambling codes or the basic midamble code used by the adjacent base stations, with which the base station in the local cell perform the multi-cell channel estimation and the extended joint detection, and value of a scramble code or a basic midamble code is relatively fixed.

III) uplink/downlink time slot configuration information of cells where the adjacent base stations exist, such as time slot IDs, time slot directions, activation states and the like. Since uplink/downlink in the TDD system may be flexibly adjusted according to the service ratio, value therefor may be changed with certain frequency. The obtained time slot configuration information of cells where the adjacent base stations exist are used to determine the uplink/downlink switching point in a frame and determine whether there are cross slots or not.

Figure 12:
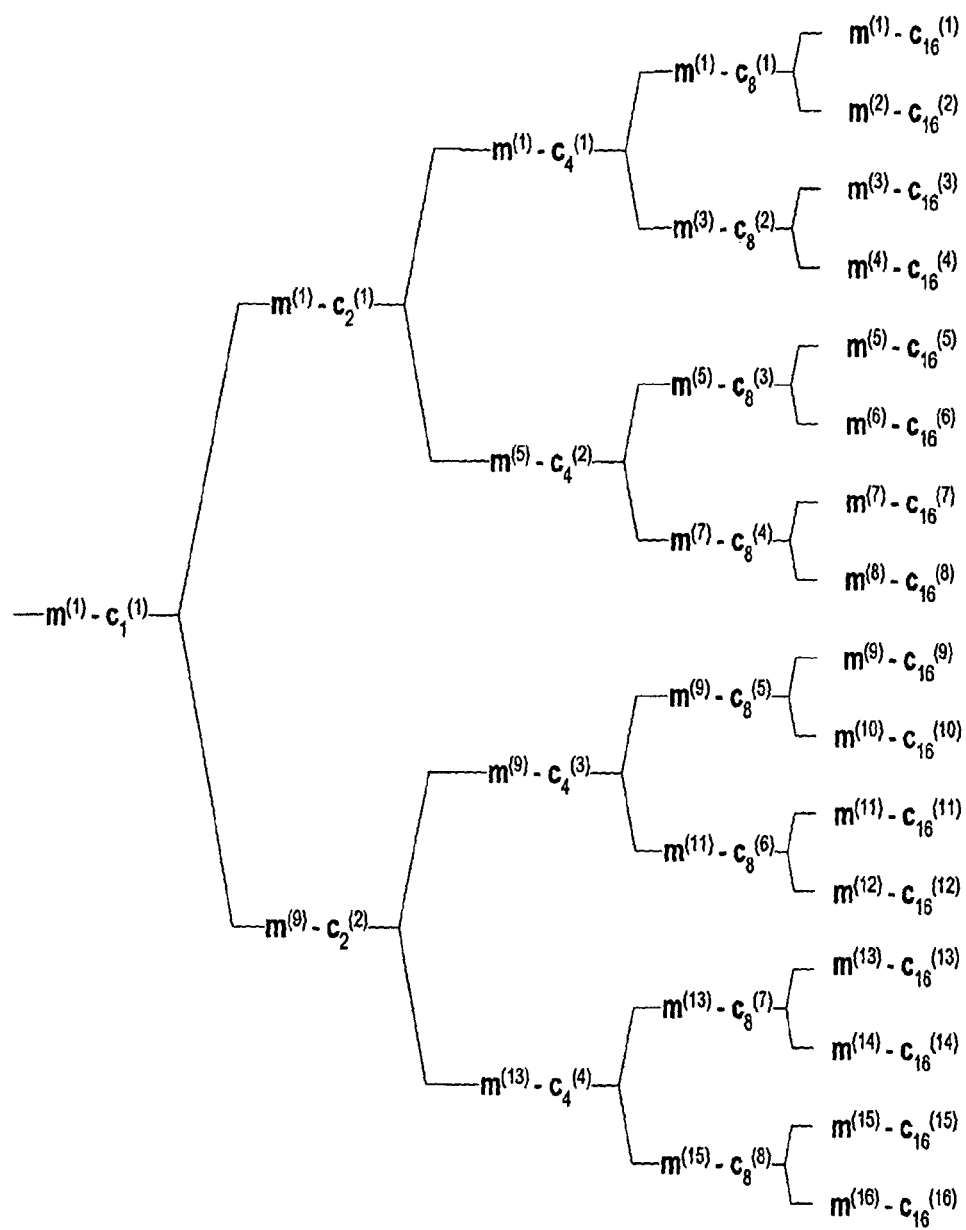
FIG. 12 is correspondences between spreading codes and middle codes defined in the default mode of 3GPP 25.221.

IV) types of downlink time slots of cells where the adjacent base stations exist, which are mainly used to indicate the correspondences between resources in a time slot, including a spreading factor SF and midamble K used in a time slot, and the correspondence between a spreading code and cyclic shift of a midamble code. For example, the correspondences between spreading codes and cyclic shifts of a midamble codes are defined by adopting default mode in 3GPP 25.221, when SF=16 and K=16, the correspondences are as shown in FIG. 12. These parameters are relatively fixed, however, the uplink/downlink directions in a time slot are changed, for example, when one time slot is changed from an uplink time slot to a downlink time slot, these parameters are correspondingly reconfigured.

Step S104 in FIG. 11 is a process of adding a new signaling according to the method of the present invention, the signaling is mainly used for RNC to notify a base station about the time slot configuration information of its adjacent cells, which is included in a configuration process and a reconfiguration process.

Step S105, RNC Operates to Allocate Wireless Resources.

When the time slot configuration information of a cell and the type of a downlink time slot are changed, RNC repeats Step S101 to reconfigure the cell, and notifies the base station about the updated information of the local cell and the updated information of its adjacent cells.

Since the application only considers the base station-to-base station cross-slot interference, in respect to a base station receiving an uplink signal, co-frequency adjacent cells causing cross-slot interference to the base station are all cells transmitting downlink signals, a downlink spreading factor may be 16 or 1 in the TD-SCDMA system, here the number of 16 is used.

Information of the delays is difficult to obtain by using the method in Chinese application No. 200410080196.6, entitled "Method for multi-cell joint detection in time-slotted CDMA system" and filed by the same assignee of the present application. Therefore, the method may not achieve good effect in the case of cross slots. However, the present application considers the base station-to-base station cross-slot interference, and the delays of a base station in an adjacent cell are fixed and small, the delays can be notified through Iub interface NBAP signaling or operation and maintain channel, so that the cross-slot interference may be efficiently suppressed during the joint detection.

Figure 5:
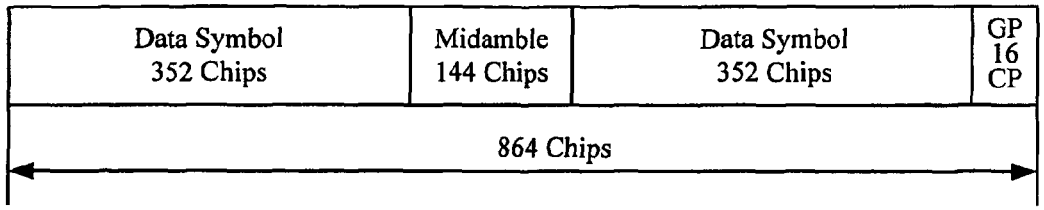
FIG. 5 is a burst structure for TD-SCDMA services.

Step 32, the multi-user signal e is divided, namely, the regular burst structure shown in FIG. 5 is divided, the middle codes of three co-frequency adjacent cells correspond to the middle codes $e_{m1}$, $e_{m2}$, $e_{m3}$ of three code sets, therefore, the overall received middle code is $e_m = e_{m1} + e_{m2} + e_{m3}$, the divided middle code $e_m$ (a receiving signal of the middle code, also called a response signal of the middle code) is used for the multi-cell channel estimation, the divided data symbol part $e_d$ is used for matched filtering.

Step 33, whether there are cross slots or not and the positions of the cross slots are determined according to the time slot configuration information obtained in Step 31, so that the base station in the local cell knows the existence of the cross-slot interference and the position of the cross-slot interference;

Step 34, performing the multi-cell channel estimation. Time slots having cross-slot interference are obtained in Step 33, the multiple code-set channel estimation method is adopted to perform channel estimation for the overall midamble code part $e_m$ obtained in Step 32, channel estimation results of three co-frequency cells are achieved, those are, overall channel response vector of all cells (the detail of the method referred to Chinese patent application No. 03100670.1, entitled "Method for multi-cell channel estimation in time-slotted CDMA system", filed on May 9, 2003).

Step 35, the configuration information of the code channels included in code channels or the maximum set of code channels of the co-frequency adjacent cells are determined, so that the code channels involved in the code channel grouping are determined.

As above described, the code channel configuration information used by co-frequency adjacent cells are determined by the multi-cell channel estimation result according to the scrambling codes, the spreading factors, the midambles K, the correspondences between the spreading codes and the cyclic shifts of the basic midamble codes, and the time delays from the base stations of the adjacent cells to the base station of the local cell.

The channel estimation results obtained in Step 34 is constructed by the channel responses of all code channels of the adjacent cells arranged in order, in order to accurately intercept the channel response of each code channel, the position of each channel are necessary. The position of the channel response of each code channel relates to the midamble K and the time delay from a user in another cell to the local cell. Therefore, to obtain the time delays is very helpful to intercept an accurate channel response $h^{(k)}$ of a code channel from the multi-cell channel estimation result.

After intercepting the channel response $h^{(k)}$ of the code channel, the corresponding spreading code of the code channel or the spreading code of each code channel in the maximum code channel set may be determined by using the intercepted channel response $h^{(k)}$ of the code channels according to the scrambling codes, the spreading factors and midambles K, the correspondences between the spreading codes and the cyclic shifts of the basic midamble codes. For example, the correspondences between the spreading codes and the cyclic shifts of the basic midamble codes may adopt the correspondences defined by the default mode in 3GPP 25.221.

Step 36, code channel grouping. The used code channels or the maximum code channel set of the co-frequency adjacent cells obtained in Step 35 are grouped, the code channels involved in the following multi-cell joint detection are determined.

In the above first grouping method based on cells to which the code channels belong according to the present invention, the code channels may be divided into three groups according to the number of cells. In this grouping method, according to the theory of Formula (7), the overall receiving signal $e_d$ after grouping may be denoted as:

$$e_d = A_0 d_0 + A_1 d_1 + A_2 d_2 + n_0 \qquad (8)$$

According to the second grouping method based on amplitude or power of code channels, firstly, the combined channel response $b^{(k)}$ of the code channels is obtained according to the channel estimation result $h^{(k)}$, amplitude and power of each code channel is estimated according to the combined channel response $b^{(k)}$; then all code channels are divided into two groups according to values of their power, the code channels to be detected (the joint detection) and code channels with strong power of interference are grouped to the code channel group involved in the joint detection, the code channels without a user be detected and with weak power are grouped to the interference code channel group. In this grouping method, according to the theory of Formula (7), the overall receiving signal $e_d$ after grouping may be denoted as:

$$e_d = A_S d_S + (A_I d_I + n_0) \quad (9)$$

Where $A_S$ and $d_S$ are a transmission matrix and transmitting data of the code channel group involved in the joint detection; and $A_I$ and $d_I$ are a transmission matrix and transmitting data of the interference code channel group.

According to the third grouping method based on coherences between the code channels, firstly, the combined channel response $b^{(k)}$ of the code channels is obtained according to the channel estimation result $h^{(k)}$, the average value of coherences between all code channels of users to be detected and all code channels of users not to be detected is estimated according to the combined channel response $b^{(k)}$; then all code channels are divided into two groups according to the average value, the code channels of users to be detected and the code channels having a coherence stronger than the average value are grouped to the code channel group involved in the joint detection, the code channels without a user be detected and having coherences less than the average value are grouped to the interference code channel group. In this grouping method, according to the theory of Formula (7), the overall receiving signal $e_d$ after grouping may be denoted as:

$$e_d = A_S d_S + (A_I d_I + n_0) \quad (10)$$

Where $A_S$ and $d_S$ are a transmission matrix and transmitting data of the code channel group involved in the joint detection; and $A_I$ and $d_I$ are a transmission matrix and transmitting data of the interference code channel group (In the second and the third grouping methods, the overall receiving signal $e_d$ after grouping uses the same expression).

When the spreading codes do not correspond to the cycle shifts of the basic midambles one by one, the used maximum code channel set of the adjacent cells is obtained with the above methods. In this case, all code channels included in the maximum code channel set are regarded as the code channels of the adjacent cells involved in the multi-cell joint detection.

Step 37, the transmission matrix A in Formulas (8)-(10) is constructed by $b^{(k)}$ (according to Formula (2), $b^{(k)}$ is obtained from $h^{(k)}$). According to the used grouping method, the transmission matrix A in Formulas (8)-(10) is constructed. If the first grouping method is used, the constructed transmission matrix A is transmission matrix $A_0, A_1, A2$ of three cells. If the second and the third grouping methods are used, the constructed transmission matrix A is $A_S$ (a transmission matrix in the code channel group involved in matrix operation in the joint detection), and $A_I$ (a transmission matrix in the conference code channel group not involved in matrix operation in the joint detection). When the constructed transmission matrix A is constructed by using the first grouping method, transmission matrixes $A_0, A_1, A2$ of three cells are respectively sent to Step 38 for the matched filtering and to Step 39 for the multi-cell joint detection; When the constructed transmission matrix A is constructed by using the second or the third grouping method, $A_S$ is sent to Step 38 for the matched filtering, $A_S$ and $A_I$ are sent to Step 39 for the multi-cell joint detection.

Step 38, matched filtering. In Formula (3) evaluating soft symbol estimated by transmitting data d, the process to evaluate $A^{*T} R_n^{-1} e$ in Formula (3) is the matched filtering in this step. Where e is data symbol $e_d$ after the data division, A is the constructed matrix. In the first grouping method, A in the matched filtering is $A_0, A_1, A_2$, in the second and the third grouping methods, A in the matched filtering is $A_S$. $R_n$ is a covariance matrix of a colored noise sequence n.

Step 39, to do matrix processing and complete the multi-cell joint detection eventually. The multi-cell joint detection is completed according to different code channel grouping methods, different constructed matrixes and the matched filtering results, that is, a matrix T is firstly obtained according to the transmission matrix A obtained in Step 37 by using one method in Formula (4), then the operation in Formula (3) is completed based on matched filtering $A^{*T} R_n^{-1} e_d$ obtained in Step 38. Wherein, the code channels involved in the joint detection are all code channels in the local cell and the code channels of the co-frequency adjacent cells which are determined to be involved in the joint detection according to one code channel grouping method.

In order to further implement the joint detection with low cost and good performance, after matched filtering for the code channels involved in the joint detection in Step 38, Step 40 may be added to perform an activation detection to the code channels after matched filtering, then the remaining activated code channels after activation detection are regarded as the code channels involved in the joint detection. At the same time, the transmission matrix A is modified according to the activated code channels involving in the joint detection.

In respect to the first code channel grouping method, the joint detection may adopt the method of "block linear equalization+interference cancellation", namely, the joint detection method of block linear equalization is adopted within three groups and the joint detection method of interference cancellation is adopted among three groups. The method includes the following steps 1)-4).

1) Each group uses the joint detection method of block linear equalization to detect the overall receiving signal $e_d$ in each group, namely, a single cell joint detection algorithm is used to detect each group. According to Formula (8), $e_d = A_0 d_0 + A_1 d_1 + A_2 d_2 + n_0$, when interference cell 1 is detected by performing the single cell joint detection, $e_d = A_1 d_1 + (A_0 d_0 + A_2 d_2 + n_0) = A_1 d_1 + n_1$, $n_1$ is interference to singles of non-interference cell 1, $d_1$ is obtained by applying the single cell joint detection method (Formula (3)), $d_2$ may be obtained with the same way.

2) Interference recovery is performed according to the detection results of respective groups, interferences $A_1 d_1$, $A_2 d_2$ from interference cell 1 and interference cell 2 to the user in the local cell are respectively obtained.

3) Interferences $A_1 d_1, A_2 d_2$ in this group are cancelled from the overall received signal $e_d$, the net signal in this group is obtained as $A_0 d_0 + n_0 = e_d - (A_1 d_1 + A_2 d_2)$.

4) The joint detection method of block linear equalization is performed on the net signal of the group having the user to be detected, and the transmitting signal result $d_0$ of the user to be detected is obtained (Formula (3)). Comparing to $d_0$ directly obtained in Step 1 by the single cell joint detection method, $d_0$ obtained in Step 4 is much more accurate because the interferences from the co-frequency adjacent cells are eliminated.

The above process only uses the interference cancellation once. In a real system, the interference cancellation may be used several times according to requirements to achieve desired performance. For example, a twice interference cancellation is to perform the above process on $d_1$, $d_2$ respectively to obtain relatively accurate data $d_1$, $d_2$ of the interference cells, then the interferences $A_1 d_1$, $A_2 d_2$ recovered from $d_1$, $d_2$ are subtracted from $e_d$ to obtain a net signal, then the joint detection method of block linear equalization is applied to the net signal to obtain an more accurate $d_0$. $d_0$ is the output of the joint detection and transmitting data after demodulation.

The detail of cancellation one or more times may be completed by setting interaction times and circularly performing the method of "block linear equalization+interference cancellation". The iteration times is the times for interference cancellation. The steps include:

1) the single cell joint detection is performed on each group with the block linear equalization method to detect the results of each group, and then a determination is made on whether the iteration times is reached or not, if the iteration times is reached, the detection result of the group having the user to be detected are output, otherwise, the process continues to Step 2);

2) Interference component caused by signal responses of each group is recovered by the detection results of each group;

3) A receiving signal cancels the interference component which is not a component of this group to obtain a net signal of each group; and 4) The net signal is regarded as the result of the grouping for the next step, then the process returns to step 1).

In the case of adopting the second and the third code channel grouping methods, the joint detection method of block linear equalization is applied to the group of the code channels involved in the joint detection. In respect to $A_S$, $A_I$ obtained during constructing the transmission matrix A, $A_S$ that is used for the multi-cell joint detection is a transmission matrix constructed by the code channel of a user in the local cell in conjunction with the code channels with high power or large coherence of the local cell or the adjacent cells; $A_I$ that is used to calculate $R_n$ is a transmission matrix constructed by the code channels of other users in the local cell or the code channels with low power or small coherence of the adjacent cells.

Therefore, the soft symbol estimated by the transmitting data ds after demodulation according to Formula (3) is:

$$\hat{d}_S = (T_S)^{-1} A^*_S{}^T R_n^{-1} e \quad (11)$$

Where the matrix $T_S$ is denoted by the following formula (choosing one option from the formula):

$$T_S = \begin{cases} I & MF \\ A_S^{*T} R_n^{-1} A_S & ZF-BLE \\ A_S^{*T} R_n^{-1} A_S + R_d^{-1} & MMSE-BLE \end{cases} \quad (12)$$

Where the covariance matrix of the colored noise interference $R_n$ may be calculated by the interference code channel grouping and background noise, the expression is:

$$R_n = E\{n \cdot n^{*T}\} = E\{(A_I d_I + n_0) \cdot (A_I d_I + n_0)^{*T}\} = A_I A_I^{*T} + \sigma^2 I \quad (13)$$

There are two methods to calculate $R_n$.

One method is strictly following Formula (13), namely, firstly, the combined channel response (the definition refers to Formula (2)) of the code channels in interference code channel group is used to construct the transmission matrix A, of the interference code channel group, then $A_I A_I^{*T}$ and the power of background noise $\sigma^2$ are calculated, and $R_n = A_I A_I^{*T} + \sigma^2 I$ is obtained finally.

The other method takes the co-frequency interferences in the interference code channel group as white noise to perform simplified processing with Formula (14):

$$R_n = E\{n \cdot n^{*T}\} = E\{(A_I d_I + n_0) \cdot (A_I d_I + n_0)^{*T}\} = A_I A_I^{*T} + \sigma^2 I \approx \sigma_I^2 I + \sigma^2 I = (\sigma_I^2 + \sigma^2) I \quad (14)$$

Namely, the power of each code channel in the interference code channel group is calculated and all of them are summed together to obtain $\sigma_I^2$ ($\sigma_I^2 I$ is the diagonal matrix of $A_I A_I^{*T}$), then the background noise power $\sigma^2$ is calculated, and $R_n = (\sigma_I^2 + \sigma^2) I$ is obtained finally.

Steps 37, 38, 39, 40 in FIG. 10 together are called the multi-cell joint detection according to the method of the present invention, that is, step 5 in FIG. 6.

The method in the present invention may applied to a time-slotted CDMA system or a wireless communication system adopting the similar signal structure, the method may also be extended to a non-CDMA time division duplex communication cell system with two or more antennae. Since multi-antenna spatial division is introduced, the joint detection may be applied in the case that the number of code channels involved in the joint detection is larger than the spreading factor and less than or equal to the result of multiplying the number of antennae by the spreading factor. For example, the time division duplex TDMA system may be regarded as a special example with SF=1, therefore, signals from the adjacent cells may be introduced to the joint detection. When the number of antennae is larger than 1, firstly, $T_S^k$ and $(A_s^k)^{*T} R_n^{-1} e^k$ of the kth antenna are calculated separately, then both of them are combined, and the joint detection is performed according to Formula (11). At this time, the adjacent cell configuration information that the system notifies to the base station is simplified, embodying in the omission of the time slot type information, namely, the spreading factors, midambles K, the correspondences between the spreading codes and the channel estimation codes.

Certainly, the present invention may have other embodiments; those skilled in the art may make variations and modifications without departing from the scope of the present invention.

The invention claimed is:

1. A method for suppressing cross-slot interference in a time-slotted Code Division Multiple Access, CDMA, system, comprising:

obtaining, by a base station, configuration information of a local cell and configuration information of co-frequency adjacent cells; wherein, the configuration information comprises time slot configuration information;

determining, by the base station, positions of cross slots according to the configuration information of the local cell and the configuration information of the co-frequency adjacent cells, and performing multi-cell channel estimation on the cross slots to obtain channel estimation result;

determining, by the base station, code channel configuration information of the co-frequency adjacent cells, grouping determined code channels and determining code channels of the co-frequency adjacent cells involved in a joint detection; and performing, by the base station, the joint detection according to the channel estimation result and determined code channels of the co-frequency adjacent cells involved in the joint detection to obtain detection data, so that the cross-slot interference in the system is suppressed without rearranging time slot configuration information of the local cell and the adjacent cells or eliminating any cross slots.

2. The method according to claim 1, wherein, the step of obtaining, by the base station, the configuration information of the local cell and the configuration information of the co-frequency adjacent cells comprises:

a radio network controller obtaining the configuration information of the local cell to which the base station belongs and the configuration information of the co-frequency adjacent cells and notifying the base station about those information.

3. The method according to claim 2, wherein, the step of notifying the base station about the configuration information of the local cell and the configuration information of the co-frequency adjacent cells by the radio network controller is implemented by two messages.

4. The method according to claim 3, wherein, the step of notifying the base station about the configuration information of the co-frequency adjacent cells by the radio network controller is implemented through one of Universal Terrestrial Radio Access Network, UTRAN, Tub interface Node B Application Part, NBAP signalling and an operation and maintenance channel signalling.

5. The method according to claim 2, wherein, the step of notifying the base station about the configuration information of the local cell and the configuration information of the co-frequency adjacent cells by the radio network controller comprises:

extending configuration information of a base station of each cell by adding configuration information of the co-frequency adjacent cells; and notifying the base station about the configuration information of the local cell and the configuration information of the co-frequency adjacent cells through one message by the radio network controller.

6. The method according to claim 5, wherein, the step of notifying the base station about the configuration information of the local cell and the configuration information of the co-frequency adjacent cells through one message by the radio network controller is implemented through Universal Terrestrial Radio Access Network, UTRAN, Tub interface Node B Application Part NBAP signalling.

7. The method according to claim 1, wherein, the configuration information of the co-frequency adjacent cells comprises: time slot configuration information, distances from base stations in the co-frequency adjacent cells and the local base station or transmission delays of signals from the base stations in the co-frequency adjacent cells to the local base station, parameter identifiers, IDs, or basic midamble codes of the co-frequency adjacent cells, and time slot types adopted by downlink time slots, the time slot types comprise spreading factors, midambles K and the correspondences between spreading codes and cyclic shifts of the basic midamble codes.

8. The method according to claim 7, wherein, the step of performing, by the base station, the multi-cell channel estimation on the time slots to obtain the channel estimation result comprises: the base station determining positions of the cross slots according to the time slot configuration information of the co-frequency adjacent cells, and then performing according to the basic midamble codes or basic midamble codes determined by the parameter identifiers, IDs, of the co-frequency adjacent cells, the multi-cell channel estimation on time slots having cross-slot interference by using a multi-cell channel estimation method to obtain the channel estimation result.

9. The method according to claim 7, wherein, the step of determining, by the base station, code channel configuration information of the co-frequency adjacent cells, grouping the determined code channels and determining the code channels of the co-frequency adjacent cells involved in the joint detection further comprises: the base station according to the transmission delays from the base stations in the co-frequency adjacent cells to the local base station or obtained by the distances from adjacent base stations to the local base station, the midambles K, the spreading factors, the correspondences between the spreading codes and the cyclic shifts of the basic midamble codes and the channel estimation result, determining code channels used in the co-frequency adjacent cells or a maximum code channel set through an activation detection, wherein all code channels in the maximum code channel set are listed as code channels used in co-frequency adjacent cells.

10. The method according to claim 1, wherein, the configuration information of the co-frequency adjacent cells comprises: time slot configuration information, distances from adjacent base stations to the local base station or transmission delays of signals from the base stations in co-frequency adjacent cells to the local base station, parameter identifiers, IDs, or basic midamble codes of the co-frequency adjacent cells, spreading codes of the co-frequency adjacent cells, midambles K and the correspondences between the spreading codes and cyclic shifts of the basic midamble codes.

11. The method according to claim 10, wherein, the step of performing, by the base station, the multi-cell channel estimation on the cross time slots to obtain the channel estimation result comprises: the base station determining the positions of the cross slots according to the time slot configuration information, and then performing according to the basic midamble codes or basic midamble codes determined by parameter IDs of the co-frequency adjacent cells, the multi-cell channel estimation on time slots having cross-slot interference by using a multi-cell channel estimation method to obtain the channel estimation result.

12. The method according to claim 10, wherein, the step of determining, by the base station, code channel configuration information of the co-frequency adjacent cells, grouping the determined code channels and determining the code channels of the co-frequency adjacent cells involved in a joint detection further comprises: the base station determining code channel configuration information of the adjacent cells according to the spreading codes used in the co-frequency adjacent cells, midambles K, the correspondences between the spreading codes and cyclic shifts of the basic midamble codes, so as to determine code channels used by the co-frequency adjacent cells.

13. The method according to claim 7, wherein, in a TD-SCDMA system, the configuration information of the co-frequency adjacent cells further comprise scrambling codes, the scrambling codes are obtained through the basic midamble codes or parameter IDs of adjacent cells.

14. The method according to claim 7, wherein, the correspondences between the spreading codes and the cyclic shifts of the basic midamble codes adopt a mode defined by default mode in Third Generation Partnership Project 25.221, 3GPP25.221.

15. The method according to claim 7, wherein,
the time slot configuration information comprises: co-frequency adjacent cell IDs, time slot IDs of cross slots between the co-frequency adjacent cells; or the co-frequency adjacent cell IDs, and the time slot IDs and uplink/downlink directions of time slots.

16. The method according to claim 7, wherein,
the transmission delays are obtained by measuring pilot signals of the co-frequency adjacent cells by the base station according to a configured measurement command.

17. The method according to claim 1, wherein,
the base station groups the determined code channels of the co-frequency adjacent cells based on cells to which the code channels belong, the number of code channel groups equals to the number of the co-frequency adjacent cells, the code channels in each group are code channels of a corresponding cell.

18. The method according to claim 1, wherein,
the base station groups the determined code channels of the co-frequency adjacent cells based on amplitude or power of the code channels, the code channels are grouped into the code channel group involved in the joint detection and interference code channel group according to amplitude or power of the code channels.

19. The method according to claim 18, wherein,
grouping the code channels according to the amplitude or power of the code channels comprises estimating the amplitude or power of each code channel signal according to the channel estimation result of the adjacent cells or the combined channel response of the code channels obtained from the channel estimation result of the adjacent cells; and dividing the code channels to be detected and the interference code channels with amplitude or power larger than a threshold to the code channel group involved in the joint detection, the interference code channels without users to be detected and with amplitude or power less than the threshold to the interference code channel group.

20. The method according to claim 1, wherein,
the base station groups the determined code channels of the co-frequency adjacent cells to the code channel group involved in the joint detection and the interference code channel group according to values of coherences between the code channels.

21. The method according to claim 20, wherein,
grouping according to the coherences between the code channels comprises estimating the coherences between the code channels in the multi-cell signal according to the channel estimation result of the adjacent cells or the combined channel response of the code channels obtained from the channel estimation result of the adjacent cells and dividing the code channels to be detected and the interference code channels with the coherence larger than a threshold to the code channel group involved in the joint detection, the interference code channels without users to be detected and with the coherence less than the threshold to the interference code channel group.

22. The method according to claim 21, wherein,
the coherences between the code channels comprise an average coherence, the maximum coherence and the minimum coherence, one is chosen for the grouping.

23. The method according to claim 1, wherein,
when the base station performs the joint detection according to the multi-cell channel estimation result and the determined code channels involved in the joint detection of the base stations, the determined code channels involved in the joint detection of the base stations are the remaining activated code channels after matched filtering and activation detection from the chosen code channels involved in the joint detection of the base stations.

24. The method according to claim 1, wherein,
the method adopted by the base station to perform the joint detection according to the multi-cell channel estimation result and the determined code channels involved in the joint detection of the base stations is: the base station adopts a single cell "block linear equalization" within each group, and adopts an "interference cancellation" among groups.

25. The method according to claim 24, wherein,
the method of adopting the single cell "block linear equalization" within each group and adopting the "interference cancellation" among groups further comprises:
performing the single cell joint detection on each group respectively to obtain the detection result of each group;
when the times of interference cancellation reaches predetermined times, outputting the detection result of the group where users to be detected locate;
when the times of interference cancellation does not reach the predetermined times, recovering interference component caused by the channel responses according to the detection result of each group, and cancelling interference component out of the current group with a received signal to obtain a net signal, the net signal being regarded as the grouping result for the next step.

26. The method according to claim 25, wherein,
the step of performing the single cell joint detection on each group respectively to obtain the detection result of each group comprises:
calculating the combined channel response of the code channels by using the channel estimation result of the adjacent cells;
constructing a transmission matrix of the adjacent cells from the combined channel response; and
performing matched filtering on data divided from the receiving signal, and performing the single cell "block linear equalization,' to the matched filtering result to obtain the joint detection result of each group.

27. The method according to claim 26, wherein,
the step of performing the matched filtering on data divided from the receiving signal and performing the single cell "block linear equalization" on the matched filtering result to obtain the joint detection result of each group further comprises:
performing activation detection on the matched filtering result; reconstructing the transmission matrix according to the activation detection result; and performing the single cell "block linear equalization" to obtain the combined detection result of each group.

28. The method according to claim 1, wherein,
the method adopted by the base station to perform the joint detection according to the multi-cell channel estimation result and the determined code channels involved in the joint detection of the base stations is: a joint detection method of performing the block linear equalization on the code channel group involved in the joint detection.

29. The method according to claim 28, wherein,
the joint detection method of performing the block linear equalization on the code channel group involved in the joint detection further comprises:

constructing a transmission matrix of the code channel group involved in the joint detection and a transmission matrix of the interference code channel group by using the combined channel response of the code channels;

performing the matched filtering between the transmission matrix of code channel group involved in joint detection, a covariance matrix of colored noise interference and the data divided from the receiving signal; and performing the joint detection on the matched filtering result by using the joint detection algorithm of block linear equalization, and outputting soft symbol estimated by obtained transmitting data as the detection data.

30. The method according to claim 29, wherein,
the covariance matrix of the colored noise interference is obtained by calculating the transmission matrix of the interference code channel group and the background noise.

31. The method according to claim 29, wherein,
the covariance matrix of the colored noise interference is obtained by processing the co-frequency inference in the interference code channel group regarding as white noise, the processing comprises: summing up power of each code channel in the interference code channel group; and summing up the power sum and power of background noise.

32. The method according to claim 28, wherein,
the step of performing the joint detection on the code channel involved in the joint detection by using the joint detection method of block linear equalization further comprises:

constructing the transmission matrix of the code channel group involved in the joint detection and the transmission matrix of the interference code channel group by using the combined channel response of the code channels;

performing the matched filtering between the transmission matrix of the code channel group involved in the joint detection, a covariance matrix of colored noise interference and the data divided from the receiving signal;

performing an activation detection on the outputted matched filtering result by the base station, and reconstructing a transmission matrix according to the activation detection result; and performing the joint detection on the transmission matrix reconfigured according to the activation detection result by using the joint detection algorithm of block linear equalization, and outputting soft symbol estimated by obtained transmitting data as the detection data.

* * * * *